United States Patent [19]

Hasegawa et al.

[11] Patent Number: 5,017,642

[45] Date of Patent: May 21, 1991

[54] PROCESS FOR PRODUCING AQUEOUS SOLUTION OF CATIONIC THERMOSETTING RESIN

[75] Inventors: Toshiyuki Hasegawa, Takarazuka; Hisao Takagishi, Soraku; Hiroshi Horiuchi, Toyonaka, all of Japan

[73] Assignee: Sumitomo Chemical Company, Limited, Osaka, Japan

[21] Appl. No.: 454,263

[22] Filed: Dec. 21, 1989

[30] Foreign Application Priority Data

Dec. 23, 1988 [JP] Japan ................................ 63-327145

[51] Int. Cl.$^5$ ...................... C08G 69/48; C08L 77/06
[52] U.S. Cl. .................................... 524/608; 524/606; 524/802; 524/842; 525/430
[58] Field of Search ............... 524/608, 606, 802, 845; 525/430

[56] References Cited

U.S. PATENT DOCUMENTS

| | | | |
|---|---|---|---|
| 2,926,116 | 2/1960 | Kelm | 162/164 |
| 2,926,154 | 2/1960 | Kelm | 524/608 |
| 3,891,589 | 6/1975 | Ray-Chaudhuri | 524/608 |
| 3,951,921 | 4/1976 | Espy et al. | 260/785 C |
| 4,336,835 | 6/1982 | Takagishi et al. | 162/164.3 |

OTHER PUBLICATIONS

Patent Abstracts of Japan, vol. 5, No. 89, (C-58)(761), Jun. 10, 1981, (JP-A-56 34 729).

*Primary Examiner*—Harold D. Anderson
*Attorney, Agent, or Firm*—Birch, Stewart, Kolasch & Birch

[57] ABSTRACT

An aqueous solution of a cationic thermosetting resin containing a very small amount of organic halogen compounds is prepared by adjusting a reaction temperature in a reaction of polyamidopolyamine with epihalohydrin and a molar ratio of the polyamidopolyamine and epihalohydrin.

4 Claims, No Drawings

PROCESS FOR PRODUCING AQUEOUS SOLUTION OF CATIONIC THERMOSETTING RESIN

BACKGROUND OF THE INVENTION

1. Field of the Invention

The present invention related to a process for producing an aqueous solution of a cationic thermosetting resin which imparts wet-strength to paper, has high stability and contains a very small amount of organic halogen compounds.

2. Description of the Related Art

From Japanese Patent Publication No. 34729/1981, it is well known that polyamidopolyamine/epichlorohydrin resins are useful as reagents for imparting wet-strength to paper. Since the polyamidopolyamine/epichlorohydrin resins disclosed in this Japanese Patent Publication are prepared by reacting polyamidopolyamine with a large amount of epichlorohydrin in order to improve long-term stability and also prolonged wet-strength imparting effect, a large amount of the organic halogen compounds (e.g. dichlorohydrin, monochlorohydrin, etc.), which are derived from unreacted epichlorohydrin and are harmful to living bodies, are contained in the resins.

SUMMARY OF THE INVENTION

For the reasons as described above, the present inventors extensively studied a process for producing an aqueous solution of a polyamidopolyamine/epichlorohydrin resin which not only imparts high degree of wet-strength to paper but also contains a very small amount of the organic halogen compounds, and has such high stability that it would not yield gels for a long period of time.

As a result, the present inventors now provide a process for producing an aqueous solution of a cationic thermosetting resin containing a very small amount of organic halogen compounds, which comprises steps of:

(i) heating an aliphatic dicarboxylic acid and a polyalkylenepolyamine in a molar ratio of the aliphatic dicarboxylic acid to the polyalkylenepolyamine of 1:1.0 to 1:1.2 until the viscosity at 25° C. of a 50% aqueous solution of resulting polyamidopolyamine reaches 400 to 1000 cps to obtain a polyamidopolyamine;

(ii) reacting the polyamidopolyamine with epihalohydrin in an aqueous medium at a temperature from 10 to 55° C. under such conditions that the amount of epihalohydrin is from 0.85 to 1.40 moles per mole of secondary amino group present in the polyamidopolyamine when the reaction temperature is from 10° to 45° C. or from 0.85 to 1.25 moles per mole of said secondary amino group when the reaction temperature is from 45° to 55° C., a total concentration of said reactants in the aqueous medium is 20 to 70% by weight until a total amount of unreacted epichlorohydrin and other organic halogen compound does not change substantially any more;

(iii) maintaining or lowering the concentration of the resulting aqueous solution of the reaction product;

(iv) keeping the temperature of the aqueous solution from 25° to 70° C. until the viscosity at 25° C. of the aqueous solution at a concentration of 15% reaches 10 to 100 cps;

(v) adjusting pH of the resulting aqueous solution of the product to 3 to 5 at 25° C.

DETAILED DESCRIPTION OF THE INVENTION

Suitable aliphatic dicarboxylic acids usable in the present invention include, for example, malonic acid, succinic acid, glutaric acid, adipic acid and sebacic acid. Among them, adipic acid is particularly preferred from the industrial point of view.

Suitable polyalkylenepolyamines usable in the present invention include, for example, diethylenetriamine, triethylenetetramine, tetraethylenepentamine and iminobispropylamine.

The molar ratio of the aliphatic dicarboxylic acid to the polyalkylenepolyamine is preferably from 1:1.0 to 1:1.2.

In the reaction of the aliphatic dicarboxylic acid with the polyalkylenepolyamine, sulfuric acid or sulfonic acids can be added as a polycondensation catalyst. Preferred catalysts include sulfuric acid, benzenesulfonic acid and p-toluenesulfonic acid. The amount of the acid to be used is in a range of 0.005 to 0.10 mole, preferably 0.01 to 0.05 mole per mole of the polyalkylenepolyamine.

The reaction of the aliphatic dicarboxylic acid with the polyalkylenepolyamine is carried out at a temperature of 100° to 250° C., preferably 130° to 200° C. The reaction is continued until the viscosity at 25° C. of the 50% aqueous solution of the resulting polyamidopolyamine reaches 400 to 1000 cps. When the viscosity is lower than 400 cps, the final product does not impart sufficient wet-strength to paper, while when the viscosity exceeds 1,000 cps, stability of the final product is deteriorated so that gelation occurs.

The resulting aqueous solution of polyamidopolyamine is then reacted with epihalohydrin.

Epihalohydrin usable for this reaction includes epichlorohydrin and epibromohydrin. Among them, epichlorohydrin is preferred from the industrial point of view.

In the reaction of polyamidopolyamine with epihalohydrin, the concentration of the reactants in an aqueous medium is from 20 to 70% by weight, preferably from 25 to 60% by weight. When the concentration is lower than the lower limit of the above mentioned range, a reaction rate of this reaction is very low or this reaction does not progress at all. When the concentration exceeds the upper limit of the above-mentioned range, a reaction rate of this reaction becomes too high, and the viscosity of the aqueous solution increases so quickly that gelation often occurs and the control of the reaction becomes difficult.

The reaction of polyamidopolyamine with epihalohydrin is carried out at a temperature from 10° to 55° C.

When the reaction temperature is higher than 55° C., the content of organic halogen compounds in the aqueous solution is so high that the objects of this invention are not fully attained. When the reaction temperature becomes lower than 10° C., the reaction time becomes too long. From the viewpoints of lowering the content of the organic halogen compounds, the reaction temperature from 10° to 35° C. is preferable.

The amount of epihalohydrin is from 0.85 to 1.40 moles per mole of the secondary amino group present in the polyamidopolyamine when the reaction temperature is from 10° to 45° C. The amount of epihalohydrin must be from 0.85 to 1.25 moles when the reaction temperature is from 45° C. to 55° C.

When the amount of epihalohydrin exceeds the above range, the content of organic halogen compounds in the aqueous solution is so high that the objects of this invention are not fully attained, while when the amount of epihalohydrin is less than 0.85, the wet strength improving effect of the final product is not developed sufficiently. From the viewpoint of lowering the content of the organic halogen compounds, the amount of epihalohydrin is preferably from 0.85 to 1.25 moles per mole of the secondary amino groups present in the polyamidopolyamine, even when the reaction temperature is from 10° to 45° C. It is more preferable that not only the amount of epihalohydrin is from 0.85 to 1.25 but also the reaction temperature is from 10° to 35° C.

Under the conditions described above, the reaction of polyamidopolyamine with epihalohydrin is continued until the total amount of unreacted epihalohydrin and the other organic halogen compound does not change substantially any more (First heating step).

When the total amount of unreacted epihalohydrin and the other organic halogen compound is changing, i.e. the reaction is not yet completed, the reaction temperature is raised to higher than 55° C., whereby the content of the organic halogen compounds will remarkably increase.

The amount of the unreacted epihalohydrin and the other organic halogen compound can be monitored by, for example, gas chromatography, etc.

After the first heating step, with maintaining or lowering the concentration of the resulting aqueous solution of the reaction product, the solution is preserved at a temperature from 25° to 70° C. in order to crosslink the polyamidopolyamine molecules which have reacted with epihalohydrin (Second heating step).

The second heating step is continued until the viscosity of the reaction product solution at the solid content of the solution of 15% reaches 10 to 100 cps, preferably 20 to 70 cps at 25° C. If the reaction in the second heating step is terminated when the viscosity is less than 10 cps at 25° C., the final product does not have sufficient wet strength improving effect. If the reaction in the second heating step is continued even after the viscosity exceeds 100 cps at 25° C., the stability of the final product is deteriorated. In addition, when the final product is added to a pulp slurry in a paper sheet forming process, the pulp slurry is vigorously foamed. The foaming not only makes the paper sheet-forming operation difficult but also damages the formation of paper made containing the final product.

When the viscosity of the reaction product solution reaches the desired viscosity (10 to 100 cps at 25° C.), the solution is diluted with water if necessary, and then in order to stop the reaction, the pH is adjusted to 3 to 5 with addition of an acid such as hydrocholoric acid, sulfuric acid, phosphoric acid, formic acid or acetic acid to obtain the final products.

The final products, i.e., the aqueous solution of the cationic thermosetting resin prepared according to the present invention are outstandingly superior in the following point to the aqueous solution of polyamidopolyamine/ epichlorohydrin resin produced by the conventional methods: The wet strength improving effect of the aqueous solution of this invention is equal to or superior to that of the conventional ones; the content of the organic halogen compounds in the aqueous solution is remarkably low; and the aqueous solution shows excellent stability.

The aqueous solution of the resin prepared according to the present invention can be used not only as the agent for imparting wet-strength to paper but also as a retention aid for fillers added on paper-making, a drainage aid for improving a paper-making rate and a flocculant for removing fine particles from dirty water such as factory waste water.

The present invention will be illustrated more in detail with reference to the following examples.

EXAMPLE 1

To a 500 ml four-necked flask equipped with a thermometer, a reflux condenser and a stirrer, were added 103 g (1.0 mole) of diethylenetriamine, 10 g of water, 138.7 g (0.95 mole) of adipic acid and 2 g (0.02 mole) of 98% sulfuric acid. While distilling off water, the temperature of the mixture was raised and reaction was carried out at 155° C. to 160° C. for 12 hours. Thereafter, 210 g of water was gradually added to obtain an aqueous solution of polyamidopolyamine having a solid content of 50.8% and a viscosity of 690 cps (25° C.).

Into another flask, 129 g (0.3 mole) of the resulting polyamidopolyamine and 57.3 g of water were added, and then 33.3 g (0.36 mole) of epichlorohydrin was dropwise added at 20° C. over 30 minutes. The resulting solution was heated to 30° C. and kept at the same temperature (first heating step).

After 10 hours from the start of keeping temperature at 30° C., the amounts of the unreacted epichlorohydrin and of the dichlorohydrin were monitored every one hour. Since the total amount did not change substantially between 15 hours and 16 hours from the start of the first heating step, after 17 hours from the start of the first heating step, 62.7 g of water was added to adjust the solid content of the reaction solution to 3.5%.

Thereafter, the resulting solution was heated to 45° C. in order to increase the viscosity of solution (second heating step). When the viscosity reached 245 cps (25° C.), 376.6 g of water was added and pH was adjusted to 3.4 with sulfuric acid. The product obtained had a solid content of 15.5% and a viscosity of 40.1 cps (25° C.). The product solution suffered from no gelation even after being stored at 50° C. for 50 days. The product contained 0.95% by weight of dichlorohydrin based on the weight of the solid in the product.

EXAMPLE 2

To the same four-necked flask as used in Example 1, were added 103 g (1.0 mole) of diethylenetriamine, 10 g of water, 138.7 g (0.95 mole) of adipic acid and 6.9 g (0.04 mole) of p-toluene sulfonic acid. While distilling off water, the temperature of the mixture was raised and reaction was carried out at 160° to 165° C. for 8 hours. Thereafter, 200 g of water was gradually added to obtain an aqueous solution of polyamidopolyamine having a solid content of 50.2% and a viscosity of 530 cps (25° C.).

All the resulting aqueous solution of polyamidopolyamine was diluted with 600 g of water, and 120.3 g (1.3 mole) of epichlorohydrin was dropwise added to the resulting solution at 20° C. over 15 minutes. The resulting solution was heated to 30° C. and kept at the same temperature for 24 hours while stirring (first heating step).

Thereafter, the resulting solution was heated to 55° C. in order to increase the viscosity of solution. When the viscosity reached 280 cps (25° C.), 750 g of water was added and pH was adjusted to 3.5 with sulfuric acid. The product obtained had a solid content of 15.5% and a viscosity of 41.2 cps (25° C.). The product solution suffered from no gelation even after being stored at 50° C. for 30 days. The product contained 1.65% by weight of dichlorohydrin based on the weight of the solid in the product.

EXAMPLE 3

To the same four-necked flask as used in Example 1, were added 103 g (1.0 mole) of diethylenetriamine, 10 g of water, 138.7 g (0.95 mole) of adipic acid and 3 g (0.03 mole) of 98% sulfuric acid. While distilling off water, the temperature of the mixture was raised and reaction was carried out at 155° to 156° C. for 18 hours. Thereafter, 205 g of water was gradually added to obtain an aqueous solution of polyamidopolyamine having a solid content of 50.2% and a viscosity of 540 cps (25° C.).

In another flask, 125 g (0.3 mole) of the resulting aqueous solution of polyamidopolyamine was diluted with 101 g of water, and then 25.0 g (0.27 mole) of epichlorohydrin was dropwise added to the resulting solution. The resulting solution was heated to 30° C. and kept at the same temperature for 8 hours while stirring (first heating step).

Then, the resulting solution was heated to 35° C. in order to increase the viscosity of the solution. When the viscosity reached 460 cps (25° C.), 289 g of water was added, and pH was adjusted to 3.4 with sulfuric acid. The product obtained had a solid content of 16.2% and a viscosity of 40 cps (25° C.). The product solution suffered from no gelation even after being stored at 50° C. for 30 days. The product contained 0.01% by weight of dichlorohydrin based on the weight of the solid in the product.

EXAMPLE 4

To the same four-necked flask as used in Example 1, were added 103 g (1.0 mole) of diethylenetriamine, 10 g of water, 138.7 g (0.95 mole) of adipic acid and 2 g (0.02 mole) of 98% sulfuric acid. While distilling off water, the temperature of the mixture was raised and reaction was carried out at 155° to 160° C. for 12 hours. Thereafter, 210 g of water was gradually added to obtain an aqueous solution of polyamidopolyamine having a solid content of 50.8% and a viscosity of 650 cps (25° C.).

Into another flask, 130 g (0.3 mole) of the resulting solution of polyamidopolyamine and 120 g of water were added, and then 33.3 g (0.36 mole) of epichlorohydrin was added. The resulting solution was heated to 50° C. and kept at the same temperature (first heating step). After the total amount of the unreacted epichlorohydrin and the dichlorohydrin became unchanged, the heating was continued to keep the solution at the same temperature (50° C.) until the viscosity of the solution reached 180 cps (25° C.). pH of the solution was adjusted to 3.5 with sulfuric acid, and water was added to dilute the solution.

The product obtained had a solid content of 15% and a viscosity of 40.6cps (25° C.). The product solution suffered from no gelation even after being stored at 50° C. for 30 days. The product contains 1.68% by weight of dichlorohydrin based on the weight of the solid in the product.

EXAMPLE 5

To the same four-necked flask as used in Example 1, were added 103 g (1.0 mole) of diethylenetriamine, 10 g of water, 138.7 g (0.95 mole) of adipic acid and 8 g (0.08 mole) of 98% sulfuric acid. While distilling off water, the temperature of the mixture was raised and reaction was carried out at 155° to 156° C. for 11 hours. Thereafter, 210 g of water was gradually added to obtain an aqueous solution of polyamidopolyamine having a solid content of 50.5% and a viscosity of 550 cps (25° C.).

In another flask, 126 g (0.3 mole) of the resulting aqueous solution of polyamidopolyamine was diluted with 226 g of water, and then 33.3 g (0.36 mole) of epichlorohydrin was added to the resulting solution. The resulting solution having a solid content of 25% by weight was kept at 30° C. for 24 hours while stirring.

Thereafter, the resulting solution was heated to 60° C. in order to increase the viscosity of solution. When the viscosity reached 500 cps (25° C.), 257g of water was added, and pH was adjusted to 3.5 with sulfuric acid. The product obtained had a solid content of 15.1% and a viscosity of 37.2 cps (25° C.). The product solution suffered from no gelation even after being stored at 50° C. for 30 days. The product contained 1.26% by weight of dichlorohydrin based on the weight of the solid in the product.

EXAMPLE 6

To the same four-necked flask as used in Example 1, were added 103 g (1.0 mole) of diethylenetriamine, 10 g of water, 138.7 g (0.95 mole) of adipic acid and 8 g (0.08 mole) of 98% sulfuric acid. While distilling off water, the temperature of the mixture was raised and reaction was carried out at 155° to 156° C. for 11 hours. Thereafter, 210 g of water was gradually added to obtain an aqueous solution of polyamidopolyamine having a solid content of 50.3% and a viscosity of 540cps (25° C.).

In another flask, 124 g (0.3 mole) of the resulting aqueous solution of polyamidopolyamine was diluted with 2.1 g of water, and then 33.3 g (0.36 mole) of epichlorohydrin was added to the resulting solution.

The resulting solution having a solid content of 60 by weight was kept at 30° C. for 20 hours while stirring, and then 114.4 g of water was added to adjust the solid content of the solution to 35% by weight.

Thereafter, the resulting solution was heated to 40° C. in order to increase the viscosity of solution. When the viscosity reached 500 cps (25° C.), 376.6 g of water was added, and pH was adjusted to 3.4 with sulfuric acid. The product obtained had a solid content of 15.7% and a viscosity of 39.4cps (25° C.). The product solution suffered from no gelation even after being stored at 50° C. for 50 days. The product contained 0.89% by weight of dichlorohydrin based on the weight of the solid in the product.

EXAMPLE 7

To the same four-necked flask as used in Example 1, were added 103 g (1.0 mole) of diethylenetriamine, 10 g of water, 131.4 g (0.90 mole) of adipic acid and 3 g (0.03 mole) of 98% sulfuric acid. While distilling off water, the temperature of the mixture was raised and reaction was carried out at 160° to 165° C. for 20 hours. Thereafter, 203 g of water was gradually added to obtain an aqueous solution of polyamidopolyamine having a solid content of 50.1% and a viscosity of 525 cps (25° C.).

In another flask, 127 g (0.3 mole) of the resulting aqueous solution of polyamidopolyamine was diluted with 116 of water, and then 33.3 g (0.36 mole) of epichlorohydrin was added to the resulting solution.

The resulting solution was heated to 40° C. and kept at the same temperature (first heating step). After the total amount of the unreacted epichlorohydrin and of the dichlorohydrin became unchanged, the heating was further continued to keep the solution at the same temperature (40° C.) until the viscosity of the solution reached 455 cps (25° C.) (5 hours from the start). Then, 370 g of water was added to dilute the solution, and pH of the solution was adjusted to 3.4 with sulfuric acid. The product obtained had a solid content of 15.9% and a viscosity of 30.8 cps (25° C.). The product solution suffered from no gelation even after being stored at 50° C. for 30 days. The product contained 1.59% by weight of dichlorohydrin based on the weight of the solid in the product.

EXAMPLE 8

To the same four-necked flask as used in Example 1, were added 103 g (1.0 mole) of diethylenetriamine, 10 g of water, 146 g (1.0 mole) of adipic acid and 3 g (0.03 mole) of 98% sulfuric acid. While distilling off water, the temperature of the mixture was raised and reaction was carried out at 155° to 160° C. for 20 hours. Thereafter, 203 g of water was gradually added to obtain an aqueous solution of polyamidopolyamine having a solid content of 50.4% and a viscosity of 565 cps (25° C.).

In another flask, 125 g (0.3 mole) of the aqueous solution of polyamidopolyamine was diluted with 116 g of water, and then 33.3 g (0.36 mole) of epichlorohydrin was dropwise added to the resulting solution.

The resulting solution was heated to 40° C. and kept at the same temperature (first heating step). After the total amount of the unreacted epichlorohydrin and of the dichlorohydrin became unchanged, the heating was further continued to keep the solution at the same temperature (40° C.) until the viscosity of the solution reached 443 cps (25° C.) (6 hours from the start).

Then, 347 g of water was added to dilute the solution, and pH of the solution was adjusted to 3.3 with sulfuric acid. The product obtained had a solid content of 15.5% and a viscosity of 32.5 cps (25° C.). The product solution suffered from no gelation even after being stored at 50° C. for 30 days. The product contained 1.46% by weight of dichlorohydrin based on the weight of the solid in the product.

EXAMPLE 9

The reaction was carried out in the same manner as in Example 1 until, in the second heating step, the viscosity of the reaction solution reached 175 cps (25° C.).

Thereafter, 332 g of water was added to the reaction solution and pH of the reaction solution was adjusted to 3.38 with sulfuric acid. The product thus obtained had a solid content of 15.3% and a viscosity of 17.4 cps (25° C.). The product contained 0.93% by weight of dichlorohydrin based on the weight of the solid in the product.

EXAMPLE 10

Reaction was carried out in the same manner as in Example 1 until, in the second heating step, the viscosity of the reaction solution reached 693 cps (25° C.).

Thereafter 330 g of water was added to the reaction solution and pH of the reaction solution was adjusted to 3.40 with sulfuric acid. The product thus obtained had a solid content of 15.5% and a viscosity of 71.0 cps (25° C.). The product contained 0.90% by weight of dichlorohydrin based on the weight of the solid in the product.

COMPARATIVE EXAMPLE 1

To the same four-necked flask as used in Example 1, were added 103 g (1.0 mole) of diethylenetriamine, 10 g of water, 138.7 g (0.95 mole) of adipic acid and 15 g (0.15 mole) of 98% sulfuric acid. While distilling off water, the temperature of the mixture was raised and reaction was carried out at 155° to 156° C. for 10 hours. Thereafter, 215 g of water was gradually added to obtain an aqueous solution of polyamidopolyamine having a solid content of 50.2% and a viscosity of 560 cps (25° C.).

In another flask, 129 g (0.3 mole) of the resulting aqueous solution of polyamidopolyamine was diluted with 118 g of water, and then 33.3 g (0.36 mole) of epichlorohydrin was added to the solution. The resulting solution was heated to 60° C., and kept at the same temperature while stirring. The reaction was further continued until the viscosity of the solution reached 250 cps (25° C.), and then pH of the solution was adjusted to 3.4 with sulfuric acid and water was added to adjust the solid content of the solution to 15%. The viscosity of the product was 31 cps (25° C.) and the product contained 2.5% by weight of dichlorohydrin based on the weight of the solid in the product.

COMPARATIVE EXAMPLE 2

To a four-necked flask, were added 129 g (0.3 mole) of the aqueous solution of polyamidopolyamine obtained in Example 1 [solid content: 50.8%, viscosity: 690 cps (25° C.)] and 135 g of water. To the resulting solution, 38.9 g mole) of epichlorohydrin was dropwise added at 25° C. over 20 minutes.

The resulting solution was heated to 50° C. and kept at the same temperature while stirring until the viscosity of the solution reached 400 cps (25° C.).

Thereafter 334 g of water was added and pH of the reaction solution was adjusted to 3.5 with sulfuric acid. The product obtained had a solid content of 15.1% and a viscosity of 44 cps (25° C.). The product contained 4.75% by weight of dichlorohydrin based on the weight of the solid in the solution.

COMPARATIVE EXAMPLE 3

To a four-necked flask, were added 129 g (0.3 mole) of the aqueous solution of polyamidopolyamine obtained in Example 1 [solid content: 50.8%, viscosity: 690 cps (25° C.)] and 497 g of water. To the resulting solution, 33.3 g (0.36 mole) of epichlorohydrin was dropwise added at 25° C. over 20 minutes.

The resulting solution was heated to 30° C. and kept at the same temperature for 24 hours while stirring and then heated to 60° C., but the viscosity of the solution did not increase.

COMPARATIVE EXAMPLE 4

To the same four-necked flask as used in Example 1, were added 103 g (1.0 mole) of diethylenetriamine, 10 g of water, 138.7 g (0.95 mole) of adipic acid and 2 g (0.02 mole) of 98% sulfuric acid. While distilling off water, the temperature of the mixture was raised and reaction was carried out at 150° to 153° C. for 3 hours. Thereafter, 76.2 g of water was gradually added to obtain an aqueous solution of polyamidopolyamine having a solid content of 74.7%.

In another flask, all the resulting aqueous solution of polyamidopolyamine and 111 g (1.2 mole) of epichlorohydrin were added. When the reaction solution was heated to 40° C. and kept at the same temperature while stirring, the viscosity of the solution increased so rapidly that the solution caused gelation during the reaction.

COMPARATIVE EXAMPLE 5

To the same four-necked flask as used in Example 1, were added 103 g (1.0 mole) of diethylenetriamine, 10 g of water, 138.7 g (0.95 mole) of adipic acid and 3 g (0.03 mole) of 98% sulfuric acid. While distilling off water, the temperature of the mixture was raised and reaction was carried out at 155° to 160° C. for 20 hours. Thereafter, 205 g of water was gradually added to obtain an aqueous solution of polyamidopolyamine having a solid content of 51.0% and a viscosity of 556 cps (25° C.).

In another flask, 125 g (0.3 mole) of the resulting aqueous solution of polyamidopolyamine was diluted with 101 g of water, and, 22.2 g (0.24 mole) of epichlorohydrin was added to the solution.

The resulting solution was heated to 30° C. and kept at the same temperature for 6 hours while stirring until the viscosity of the solution reached 447 cps (25° C.).

Thereafter, 320 g of water was added and pH of the reaction solution was adjusted to 3.4 with sulfuric acid. The product obtained had a solid content of 15.5% and a viscosity of 32.5 cps (25° C.).

As shown in Table 1 (Reference example), the product thus obtained could impart very low degree of wet-strength to paper.

REFERENCE EXAMPLE

Using the aqueous resin solution obtained in each of Examples 1 through 10 and Comparative Examples 1, 2, 3 and 5, a paper sheet-forming test was carried out according to the TAPPI standard sheet-forming method, and the wet breaking length of the resulting paper sheet was measured. The sheet-forming conditions were as follow:

| Test pulp: | NBKP/LBKP (1/1) mixture |
|---|---|
| Beating degree: | 420 cc (Canadian standard freeness) |
| Amount of resin: | 0.4% (based on pulp) |
| Heat treatment: | 110° C. × 4 min. |
| Average basis weight: | 60 g/m² |

| Resin prepared in | Wet breaking length (km) |
|---|---|
| Example 1 | 1.76 |
| 2 | 1.70 |
| 3 | 1.66 |
| 4 | 1.76 |
| 5 | 1.74 |
| 6 | 1.70 |
| 7 | 1.72 |

-continued

| Resin prepared in | Wet breaking length (km) |
|---|---|
| 8 | 1.73 |
| 9 | 1.68 |
| 10 | 1.78 |
| Comp. Exam. 1 | 1.73 |
| 2 | 1.75 |
| 3 | 0.78 |
| 5 | 1.32 |

What is claimed is:

1. A process for producing an aqueous solution of a cationic thermosetting resin containing a very small amount of organic halogen compounds, which comprises steps of:
   (i) heating an aliphatic dicarboxylic acid and a polyalkylenepolyamine in a molar ratio of the aliphatic dicarboxylic acid to the polyalkylenepolyamine of 1:1.0 to 1:1.2 until the viscosity at 25° C. of a 50% aqueous solution of resulting polyamidopolyamine reaches 400 to 1000 cps to obtain a polyamidopolyamine;
   (ii) reacting the polyamidopolyamine with epihalohydrin in an aqueous medium at a temperature from 10° to 55° C. under such conditions that the amount of epihalohydrin is from 0.85 to 1.40 moles per mole of secondary amino group present in the polyamidopolyamine when the reaction temperature is not lower than 10° C. and lower than 45° C. or from 0.85 to 1.25 moles per mole of said secondary amino group when the reaction temperature is from 45° to 55° C., a total concentration of reactants in the aqueous medium is 20 to 70% by weight until a total amount of unreacted epichlorohydrin and other organic halogen compound does not change substantially;
   (iii) maintaining or lowering the concentration of the resulting aqueous solution of the reaction product;
   (iv) keeping the temperature of the aqueous solution from 25° to 70° C. until the viscosity at 25° C. of the aqueous solution at a concentration of 15% reaches 10 to 100 cps;
   (v) adjusting pH of the resulting aqueous solution of the product to 3 to 5 at 25° C.

2. The process according to claim 1, wherein the reaction temperature of polyamidopolyamine with epihalohydrin in the step (ii) is from 10° to 35° C.

3. The process according to claim 1, wherein the amount of epihalohydrin is from 0.85 to 1.25 moles per mole of the secondary amino group present in polyamidopolyamine, and the reaction temperature in the step (ii) is from 10 to 45° C.

4. The process according to claim 1, wherein the amount of epihalohydrin is from 0.85 to 1.25 moles per mole of the secondary amino group present in polyamidopolyamine, and the reaction temperature in the step (ii) is from 10 to 35° C.

* * * * *